(12) United States Patent
Huang et al.

(10) Patent No.: US 12,542,609 B2
(45) Date of Patent: Feb. 3, 2026

(54) AUTOMATIC ALIGNMENT METHODS FOR FREE-SPACE OPTIC COMMUNICATION

(71) Applicant: Panduit Corp., Tinley Park, IL (US)

(72) Inventors: Yu Huang, Orland Park, IL (US); Jose M. Castro, Naperville, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 272 days.

(21) Appl. No.: 18/504,211

(22) Filed: Nov. 8, 2023

(65) Prior Publication Data

US 2025/0150169 A1    May 8, 2025

(51) Int. Cl.
| | |
|---|---|
| *H04B 10/00* | (2013.01) |
| *G02B 6/26* | (2006.01) |
| *G02B 6/42* | (2006.01) |
| *H04B 10/112* | (2013.01) |
| *H04J 14/00* | (2006.01) |

(52) U.S. Cl.
CPC ........... *H04B 10/112* (2013.01); *G02B 6/262* (2013.01); *G02B 6/4206* (2013.01)

(58) Field of Classification Search
CPC ... H04B 10/11; H04B 10/112; H04B 10/1123; H04B 10/1125; H04B 10/114; H04B 10/1143; H04B 10/116; H04B 10/118
See application file for complete search history.

(56) References Cited

U.S. PATENT DOCUMENTS

| | | | | |
|---|---|---|---|---|
| 2022/0345221 A1* | 10/2022 | Mitchell | ............ | H04B 10/1121 |
| 2025/0141548 A1* | 5/2025 | Takata | ................ | H04B 10/116 |
| 2025/0141564 A1* | 5/2025 | Miller | ................ | H04B 10/1123 |

\* cited by examiner

*Primary Examiner* — Daniel G Dobson
(74) *Attorney, Agent, or Firm* — Christopher K. Marlow; Christopher S. Clancy; James H. Williams

(57) ABSTRACT

A low-latency free-space optical data communication channel with automatic alignment function has an optical channel, collimators, high reflective screens, and cameras. The optical channel can have two optical lenses designed to facilitate the transmission of an optical signal. The collimators can be integrated with optical fibers and precisely positioned at a focal point of the two optical lenses. Reflective screens, films or tapes encircle both transmitting and receiving lenses. Cameras at each transmitting and receiving terminal are positioned to monitor the optical signal's impact on a lens surface or a high-reflective screen on the opposite side. The cameras use at least one lens to get focused image on a camera sensor and records the optical beam spot impacting the opposite side. Corresponding LED(s) aligned with the lens position on the opposite side allow the computation of the disparity between the optical signal and the lens positioned on the opposite side.

12 Claims, 14 Drawing Sheets

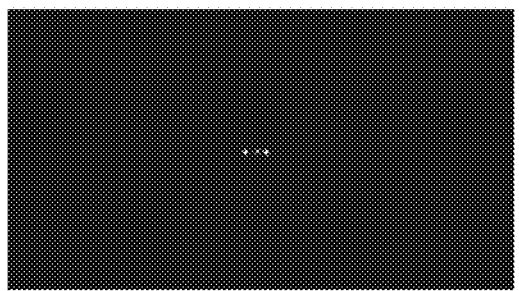 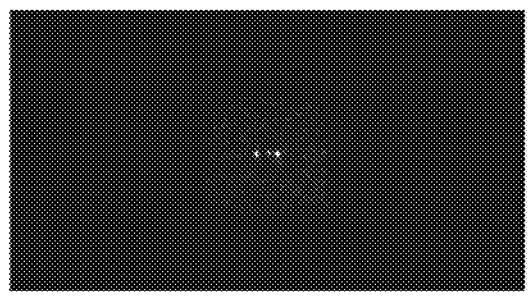
Fig. 8A                    Fig. 8B

AUTOMATIC ALIGNMENT METHODS FOR FREE-SPACE OPTIC COMMUNICATION

FIELD OF INVENTION

The present invention generally relates to high-speed optical fiber communication channels, specifically low-latency optical channels. The disclosed apparatus and method enable optical communication signals to propagate through free space, thereby traveling at the speed of light in the air, minimizing propagation time. In addition, the disclosed apparatus and method provide an automatic optic alignment method, which builds or recovers the free-space optical fiber communication channels in a short time.

BACKGROUND

Free-space optical communications (in various forms) have been used for thousands of years. For example, the ancient Greeks used a coded alphabetic system of signals to communicate, utilizing torches. In 1880, Alexander Graham Bell demonstrated voice communications over free-space optics between two buildings some 213 meters apart. Free-space optical communications are widely used in commercial, military, and space applications.

In high-speed trading in financial markets, traders demand minimum transaction delay and guaranteed equivalent optical signal delay compared to other traders. These high-speed transactions propagate over standard single-mode and multimode optical fibers. To ensure equal trading delays, optical fiber cable assemblies are custom manufactured. The fiber lengths within the cable are precisely measured using optical time domain reflectometers (OTDRs) to ensure the optical channel delays are equivalent.

The speed of an optical signal is determined by the refractive index of the medium in which it propagates, where the refractive index is the optical dielectric constant of the medium. The refractive index, n, is defined by, $$n = \frac{c}{v} \quad [1]$$

where c is the speed of light in a vacuum (299,792,458 m/s), and v is the speed of the optical signal in the medium. Generally, the refractive index of glass used in optical fibers is about 1.467. Hence, the speed of light in optical fiber is 204,357,504 m/s or 68% of the maximum speed of light in a vacuum. Given a typical channel length of 75 m, the time of flight in a vacuum is 250 ns. For light propagating through glass optical fiber, the time of flight for a 75 m channel is 367 ns, introducing a delay of 117 ns, or 0.117 μs. For high-speed trading, this is not acceptable.

To reduce the propagation delay of the optical channel, fiber manufacturers are developing hollow-core fibers (HCF), where the core is a channel of air surrounded by an array of hollow tubes forming reflective micro-structures cladding to confine the optical beam, FIG. 1.

The authors of this disclosure measured the refractive index and hence the optical signal delay in a commercially available HCF. The refractive index was $n_{hcf}$=0.000476, yielding a 0.0476% delay compared to vacuum. This means the speed of light in HCF is almost as fast as in a vacuum, and HCF should fit the need for high-speed trading. However, these fiber types are complicated to manufacture in high volume and are extremely expensive, i.e., hundreds to thousands of dollars per meter. Furthermore, HCF also exhibits high attenuation (insertion loss) due to the coupling of the light's electromagnetic fields with the surrounding fiber core structure. In addition, due to the highly controlled spacing between fiber core elements, these fiber types are very fragile and susceptible to degradation in performance due to bending. Consequently, HCF must have a robust cable design and a large bend radius not to deform or damage the core structure. Hence, there is a need for a low-cost solution where the optical signal propagates near the speed of light in a vacuum so that channels of said communication signals undergo minimum delay, and traders can be guaranteed equivalent optical channel paths.

U.S. patent application Ser. Nos. 17/955,676, 18/196,519, and 18/106,136, which are hereby incorporated by reference in their entirety, disclose the apparatus and method for free-space optical communication channels for high-speed, low-latency applications where the channels do not have to utilize expensive hollow core fibers. FIG. 2 illustrates the optical components and method for such free-space optical communication channels, where the end face of an optical fiber 100 is placed at the focal point of an optical lens 112.

To transmit the optical signal over a given distance, the light beam must be collimated to minimize the signal divergence and, therefore, the channel insertion loss, providing a signal amplitude high enough for the receiver to detect an error-free signal. This is achieved by placing an optical fiber 100 at the focal point of lens 112. The optical communication signals emanating from fiber 100, positioned at the focal point of lens 112, produced a collimated beam. Here the fiber 100 and the lens 112 forms a fiber collimator and fiber 130 and the lens 132 forms another fiber collimator after fiber 130 is positioned at the focal point of lens 132. As a result, the optical beam impinges on receiving lens 132, and the transmitting core is imaged onto the corresponding cores in fiber 130, resulting in a free-space optical communication channel.

As the transmissive collimating lens system provides an efficient and relatively low-cost solution to low latency communication, the transmissive lenses have aberrations, such as chromatic aberration, which cannot focus all colors or wavelengths to the same point hence limit the spectrum of the optical signal. Therefore, it would be beneficial to eliminate all these aberrations in the free-space optical communication channels.

Off-axis parabolic (OAP) mirrors 200 are mirrors whose reflective surfaces are segments of a parent paraboloid. They focus a collimated beam to a spot or collimate a divergent source. The reflective design eliminates chromatic aberration and other types of aberrations introduced by transmissive optics and makes these well-suited for use with wide-band free-space optical communication. FIG. 3 illustrates the optical components and method for such wide-band free-space optical communication channels using parabolic mirrors. A transmitted optical communications signal emitted from the output end face of the optical fiber 100 diverges at an angle and is collimated by the parabolic mirror 200. The optical beam impinges on receiving parabolic mirror 210, and the transmitting core is imaged onto the corresponding cores in fiber 130, resulting in a free-space optical communication channel.

To get the maximum optical signal power at the receiving fiber 130, we need to align the optic beam coming out from the optic lens angularly using angular alignment mount such as Thorlabs KC1T kinematic mount shown in FIG. 4. It can adjust the angles at both horizontal and vertical direction by adjusting the gap distance of the two plates through the two screws at diagonal direction either manually or using electrical control using motorized or piezo actuatora.

When the system achieves optimal alignment, with light from the transmitting fiber 100 effectively received by the receiving fiber 130, as depicted in FIG. 5A, it logically follows that this alignment is bi-directional. In other words, light emerging from the receiving fiber 130 should reciprocally be received by the transmitting fiber 100, as evident in FIG. 5B. This bi-directional characteristic is a result of the reversibility of the light path. Conversely, in instances where the receiving fiber 130 fails to capture light from the transmitting fiber 100, any light emitted by the receiving fiber 130 should inherently remain incapable of reaching the central point of the transmitting lens 112. This scenario is illustrated in FIG. 5C.

The typical alignment procedure for a free-space optical communication channel is outlined as follows: Initially, visible light is introduced into the transmitting fiber 100, and the angular alignment mount is adjusted until the collimated visible light incidents at the center of the receiving lens 132. Subsequently, visible light is launched into the receiving fiber 130, and adjustments are made to the angular alignment mount until the collimated visible light from the receiving fiber 130 is incident at the center of the transmitting lens 112. This process facilitates the coupling of a portion of the optical power emitted from the transmitting fiber 100 into the receiving fiber 130. The receiving fiber 130 is then connected to a power meter, and adjustments are made to the angular alignment mount at both transmitting and receiving ends until the power meter registers maximum optical power.

This alignment procedure requires a substantial amount of time and the expertise of a skilled technician. Moreover, disruptions such as shocks or vibrations could readily result in the absence of any optical power being received at the receiving fiber, rendering it impossible to recover the alignment through precise angular scanning guided by power meter feedback.

Additionally, while recovering alignment via an extended, blind angular scan of the two angular alignment mounts is possible for shorter channels, achieving success for significantly longer channels becomes less viable. For instance, in a scenario involving a 100-meter channel, where complete misalignment arises due to shock or vibration, and accounting for an optical beam diameter of around one inch, the optical beam might deviate from the lens center by up to 10 inches. Consequently, the optical beam must traverse a 20-inch by 20-inch area to regain alignment with the center of the receiving lens. With two angular alignment mounts, there exists a multitude of 20×20×20×20 angle combinations that necessitate scanning. This results in a cumulative 160,000 angle combinations and power meter measurements in the receiving fiber.

Assuming scanning to each angle combination and power meter measurement takes approximately one second, the complete process would entail 44 hours to exhaustively scan all the combinations and reestablish alignment. Given this extensive timeframe, a pressing necessity emerges to devise an automatic alignment methodology capable of promptly restoring alignment without relying on human intervention or resorting to exhaustive, prolonged scans.

SUMMARY

A low-latency free-space optical data communication channel with automatic alignment function has an optical channel, collimators, high reflective screens, and cameras. The optical channel can have two optical lenses designed to facilitate the transmission of an optical signal. The collimators can be integrated with optical fibers and precisely positioned at a focal point of the two optical lenses. Reflective screens, films or tapes encircle both transmitting and receiving lenses. Cameras at each transmitting and receiving terminal are positioned to monitor the optical signal's impact on a lens surface or a high-reflective screen on the opposite side. The cameras use at least one lens to get focused image on a camera sensor and records the optical beam spot impacting the opposite side. Corresponding LED(s) aligned with the lens position on the opposite side allow the computation of the disparity between the optical signal and the lens positioned on the opposite side.

BRIEF DESCRIPTION OF THE DRAWINGS

FIG. 8A shows a captured image reflecting the perspective of the camera sensor.

FIG. 8B shows the image of FIG. 8A with the supplementary inclusion of 650 nm illumination directed onto the prismatic reflective film.

DESCRIPTION OF INVENTION

The essential factors contributing to achieving automatic alignment of two initially fully misaligned fiber collimators revolve around two core aspects: the system's ability to detect if there is misalignment from the fiber collimators and its capacity to quantify the extent of misalignment present in both collimators. The extent of collimator misalignment is defined by the displacement between the optical beam and the center of the targeted lens. To achieve this, a camera is positioned on the transmitting side to determine the receiving lens location and its central point through the presence of LEDs surrounding the receiving lens. This same camera, if sensitive to the optical beam's spectrum, can perceive the transmitting optical beam's spot. When misalignment occurs, this beam is projected onto a highly reflective screen enveloping the receiving lens, thus reflecting the optical beam back to the camera. Typically, camera sensors are not very sensitive to the wavelengths emitted by optical transceivers for optical fiber communication, such as 850 nm, 1310 nm, and 1550 nm. To enhance visibility, visible light such as 650 nm laser can be coupled into the transmitting fiber using wavelength multiplexing division (WDM) filter, facilitated by 650 nm LEDs at the opposite side, ensuring detectability by cameras. Furthermore, the camera can be equipped with a narrow bandpass filter operating at 650 nm, exclusively permitting the observation of the reflected optical beam and the LEDs at the opposing end of the channel, and getting rid of the noise from the environment.

Figure 6:
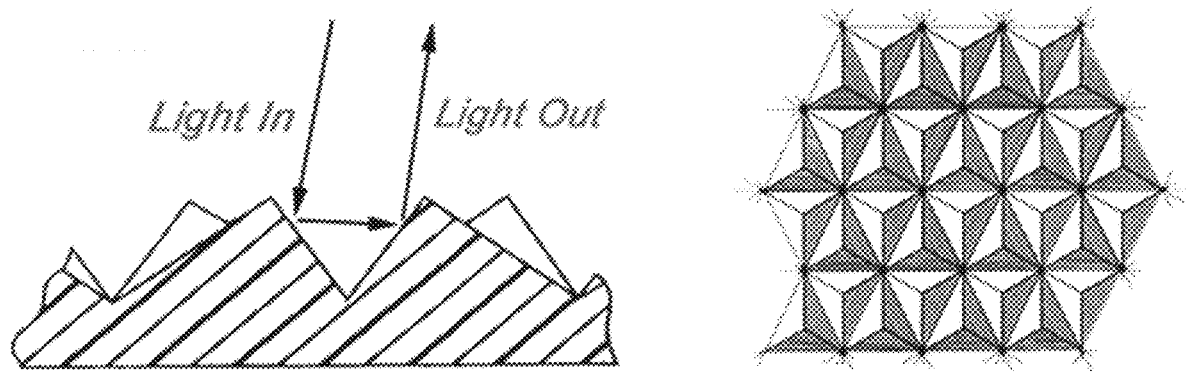
FIG. 6 shows how reflective tape is characterized by its prismatic microstructure.

Certain materials possess a high reflectivity towards incident light. An instance of this is the 3M Prismatic Reflective Tape, a specialized adhesive tape crafted by 3M to bolster visibility and safety. This reflective tape is characterized by its prismatic microstructure, comprised of minute prisms that adeptly reflect light from diverse angles, functioning akin to a retroreflector as shown in FIG. 6. This property ensures that any incident light is reflected back to its source, facilitating optimal visibility and detection.

Figure 1:
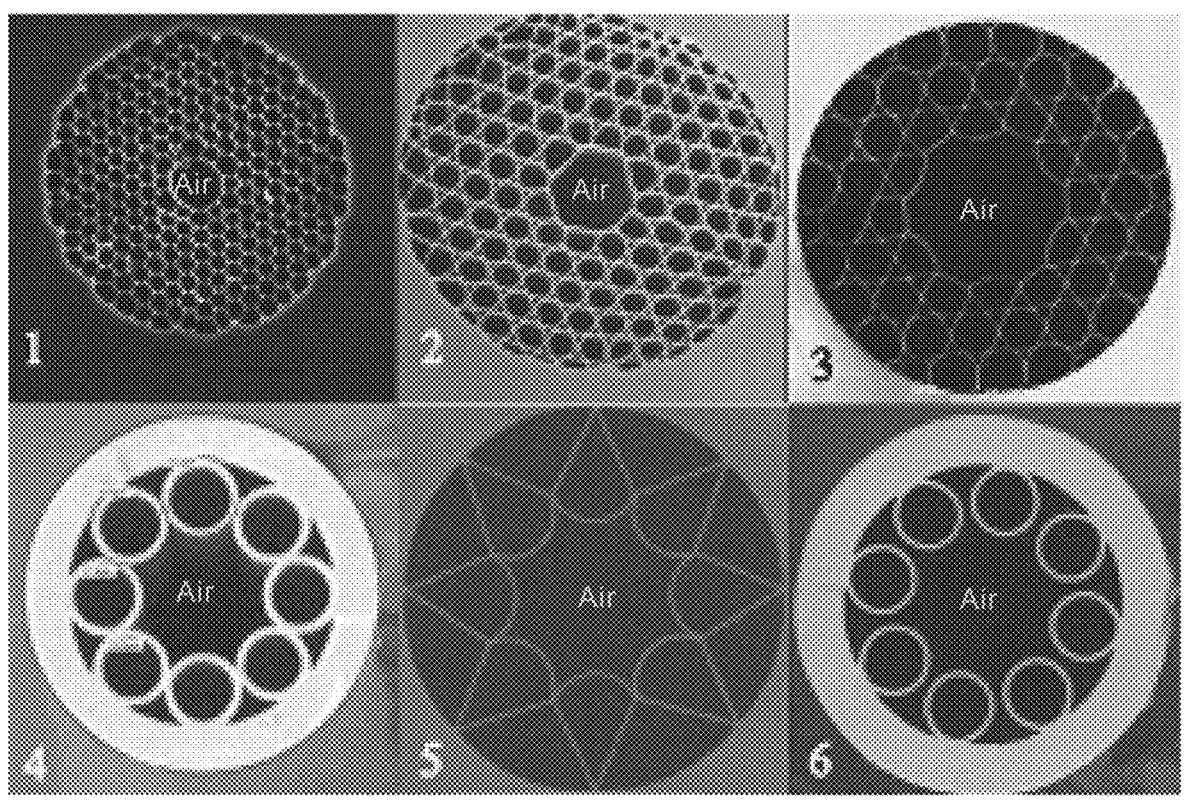
FIG. 1 shows various cross-sectional views of hollow core fibers (HCF).
Figure 2:
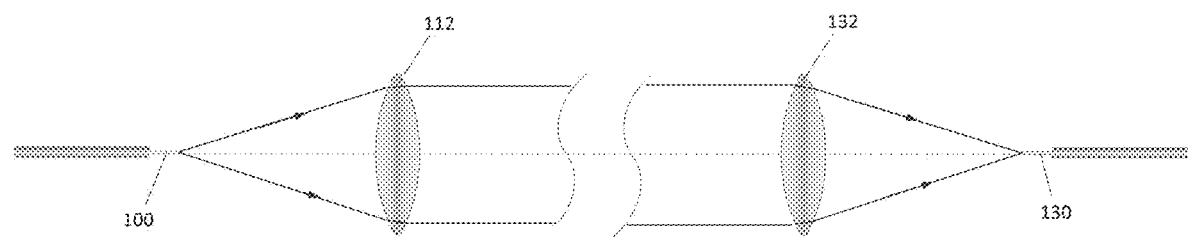
FIG. 2 illustrates the optical components and method for free-space optical communication channels.
Figure 3:
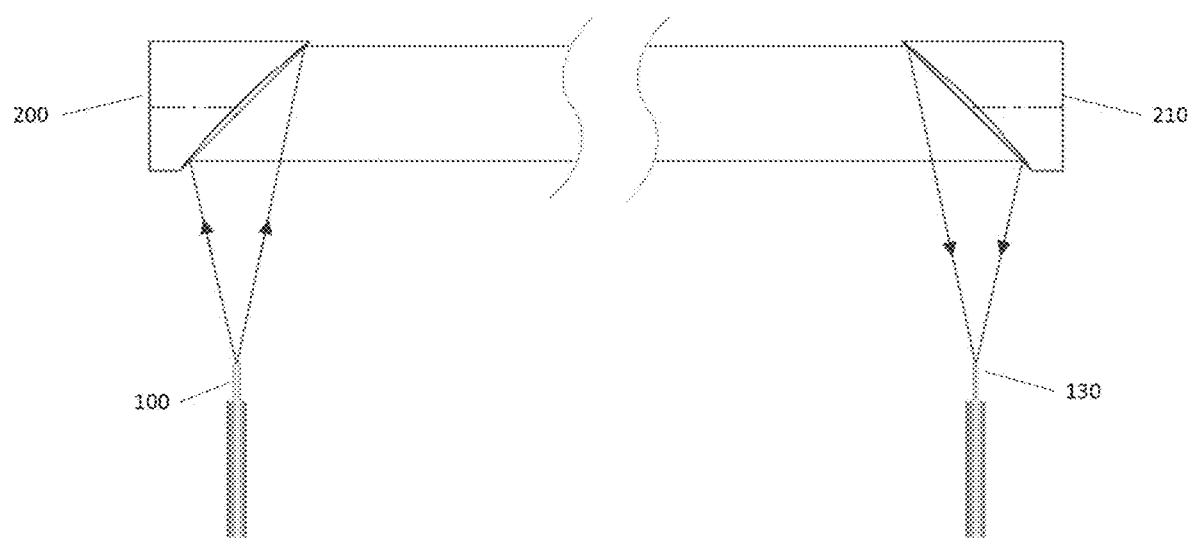
FIG. 3 illustrates the optical components and method for such wide-band free-space optical communication channels using parabolic mirrors.
Figure 4:
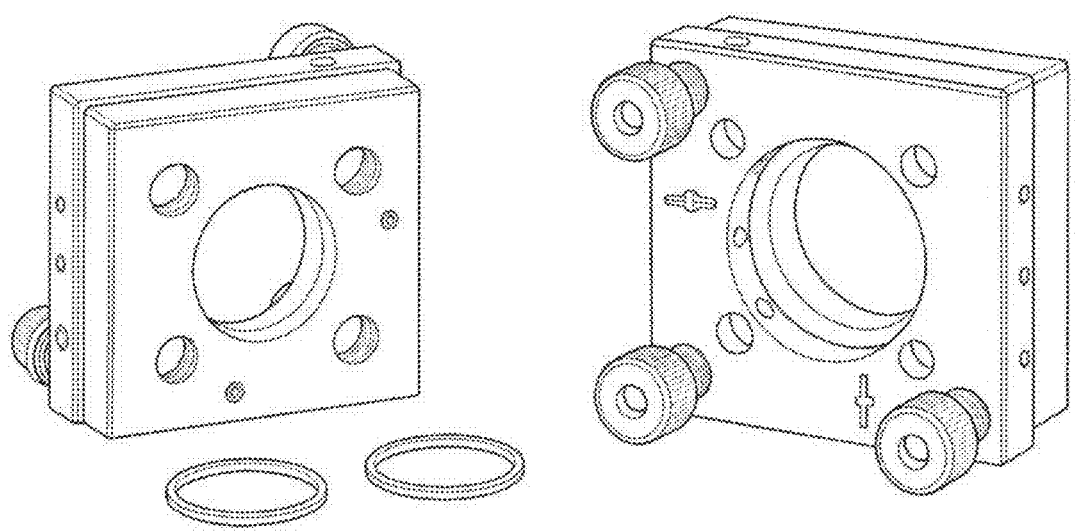
FIG. 4 shows a Thorlabs KC1T kinematic mount.
Figure 5A:
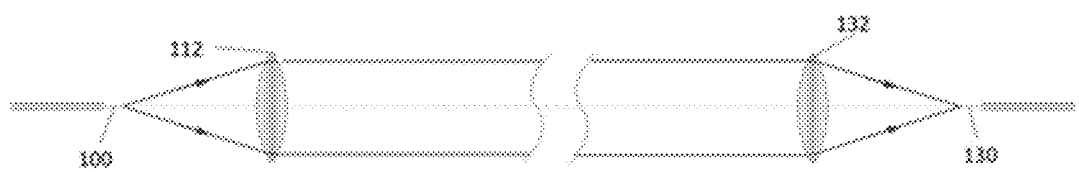
FIG. 5A shows a system that has achieved optimal alignment.
Figure 5B:
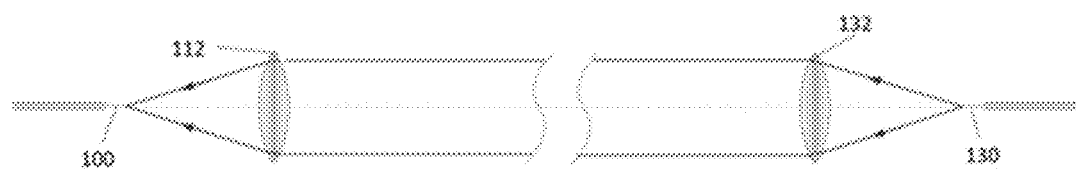
FIG. 5B shows that the system of 5*a* is bi-directional when it has achieved optimal alignment.
Figure 5C:
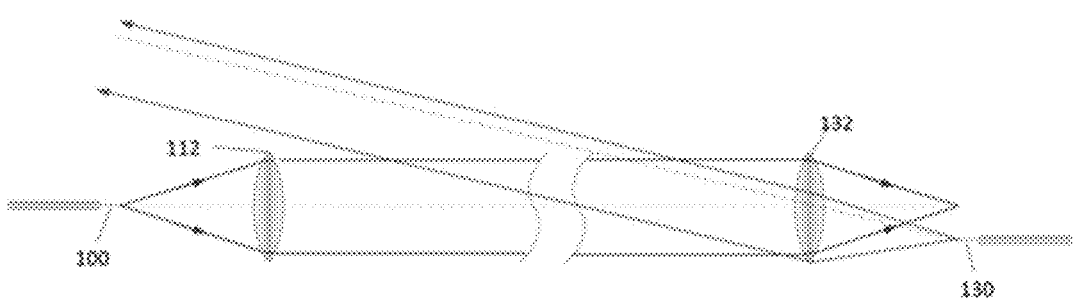
FIG. 5C shows a system not in optimal alignment.
Figure 7:
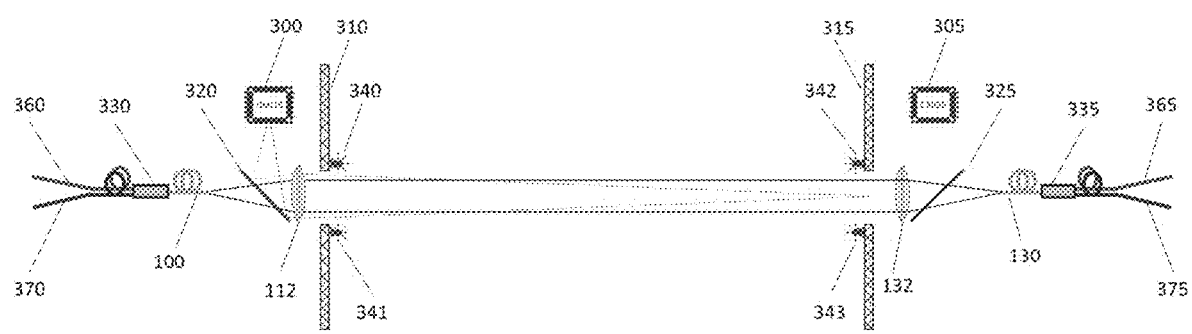
FIG. 7 shows a configuration for the automatic alignment of a free space optical channel.

The configuration for the automatic alignment of the free space optical channel is comprehensively depicted in FIG. 7. In tandem with the free space optical channel illustrated in FIG. 2, this arrangement incorporates two camera sensors, denoted as 300 and 305, strategically positioned to observe the lenses at opposing ends. Accompanying these sensors are two beam splitters or filters, designated as 320 and 325. Their purpose lies in diverting a portion of incoming visible light towards the camera sensors, while simultaneously guiding incoming optical beams from optical transceivers towards the respective fibers. Enhancing the optical system are two prismatic reflective films, labeled as 310 and 315, which proficiently redirect incoming visible optical beams back to their light sources.

Further enhancing the setup are two wavelength division multiplexers (WDM), namely 330 and 335. These components are equipped with ports, denoted as 360 or 365, facilitating the passage of light from optical transceivers, while also encompassing ports 370 and 375 designed to accommodate visible light. Complementing this configuration are LEDs, identified as 340, 341, 342, and 343, serving to demarcate the precise positions of the lenses, namely 112 and 132.

Within FIG. 7, the collimators achieve precise alignment, ensuring that the light emitted from the transmitting fiber 110 is accurately incident upon the center of the receiving lens 132. Moving to FIG. 8A, a captured image reflects the perspective of the camera sensor 300 as observed in FIG. 7. This image further showcases the visible light originating from the transmitting fiber 110, impeccably incident upon the central point of LEDs 342 and 343 on the receiving end. Transitioning to FIG. 8B, the image duplicates that of FIG. 8A, yet with the supplementary inclusion of 650 nm illumination directed onto the prismatic reflective film 315. This strategic addition allows for the visualization of the prismatic reflective film's exact location.

Figure 9:
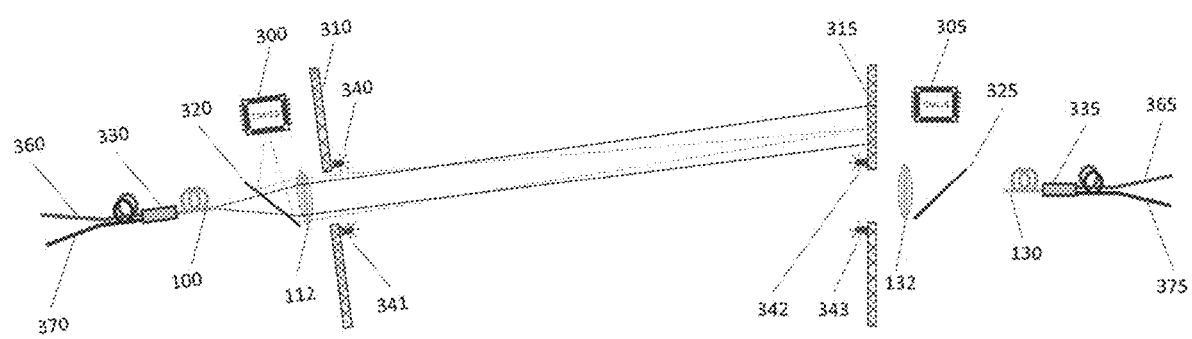
FIG. 9 shows the configuration of FIG. 7 except the incoming optical beam stemming from the transmitting fiber no longer aligns with the center of the receiving lens.

FIG. 9 portrays the identical automatic alignment system, albeit with a notable distinction. Here, the incoming optical beam stemming from the transmitting fiber 100 no longer aligns with the center of the receiving lens 132; instead, it is incident upon the prismatic reflective film 315.

Figure 10A:
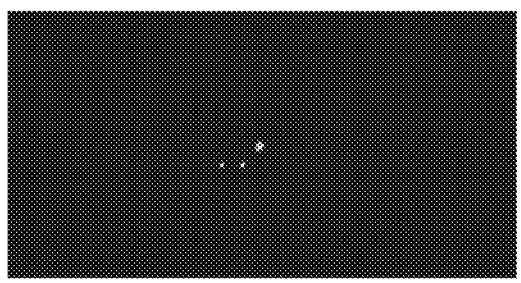
FIG. 10A portrays the perspective captured by the camera sensor within FIG. 9.

FIG. 10A portrays the perspective captured by the camera sensor 300 within FIG. 9. This imagery also encompasses the visible light originating from the transmitting fiber 110, cast upon the prismatic reflective film 315 situated at the receiving end. Transitioning to FIG. 10B, it replicates the depiction of FIG. 8A while introducing an additional 650 nm illumination onto the prismatic reflective film 315. This augmentation facilitates the visualization of the prismatic reflective film's precise location. A comparative analysis between FIG. 8B and FIG. 10B reveals a constant alignment of the reflected laser spot on the camera sensor (positioned around the image's center), mirroring the transmitting optical beam in tandem overlap with the center of camera image.

Figure 10B:
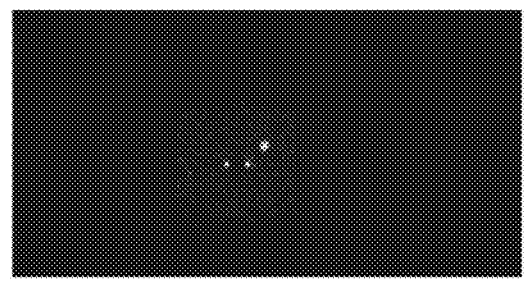
FIG. 10B reveals a constant alignment of the reflected laser spot on the camera sensor.
Figure 11A:
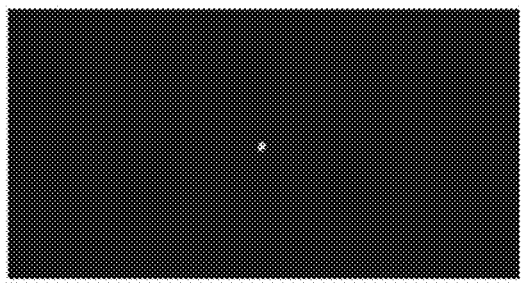
FIG. 11A shows an image solely featuring a reflected optical beam spot.
Figure 11B:
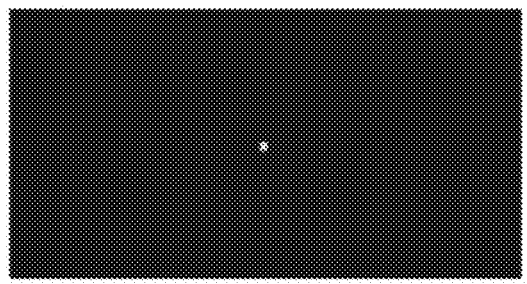
FIG. 11B shows the centroid of FIG. 11A.
Figure 11C:
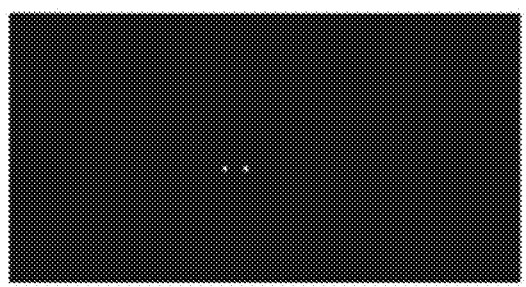
FIG. 11C shows the captured image of LEDs 342 and 343.
Figure 11D:
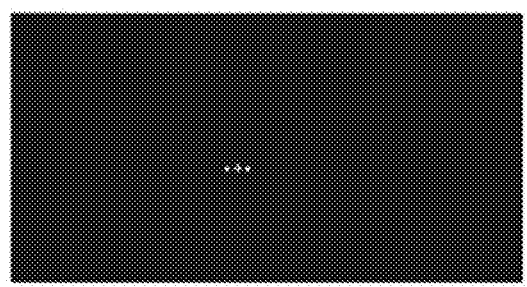
FIG. 11D shows the centroid of FIG. 11C.
Figure 11E:
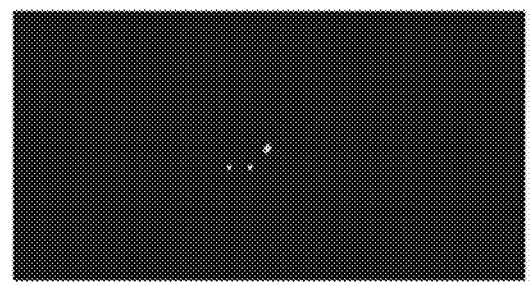
FIG. 11E shows the centroid from FIG. 11B superimposed on FIG. 11D.
Figure 11F:
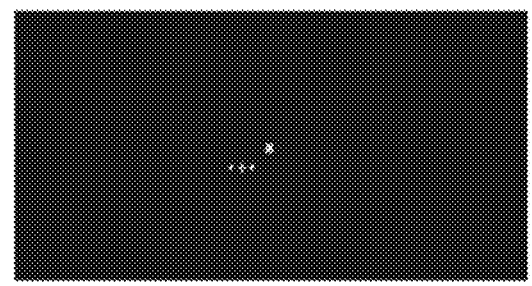
FIG. 11F shows the centroid from 11B and the centroid from 11D.

Derived from FIG. 9 and FIGS. 10A and 10B, it becomes evident that the optical beam suffers from misalignment. Additionally, we can deduce the extent of this misalignment, as demonstrated in FIGS. 11A-F. When misalignment occurs, exemplified in FIG. 9, LEDs 342 and 343 are extinguished, and a picture is captured using camera sensor 300, resulting in FIG. 11A, an image solely featuring a reflected optical beam spot. By computing the centroid of FIG. 11A and marking its position as "x" within the same image, as indicated in FIG. 11B, we pinpoint the optical beam's location. For instance, if camera sensor 300 boasts a resolution of 1280×720, the coordinates of "x" approximate [640, 360], denoting the image's center where the optical beam spot resides.

With the optical beam's spot located, we proceed to identify the center of receiving lens 132, coinciding with the center of LEDs 342 and 343. At this juncture, we extinguish the transmitting fiber's laser, activate LEDs 342 and 343, capture an image using camera sensor 300, resulting in FIG. 11C. Calculating the centroid of FIG. 11C and denoting its position as "+," visible in FIG. 11D, establishes the center of LEDs 342 and 343, synonymous with the center of receiving lens 132. The pixel discrepancy between "x" and "+" reveals the deviation between the incoming optical beam and receiving lens 132, presented in FIG. 11F. Through calibration, the system determines the angular value dθ represented by each pixel. This knowledge enables the translation of the pixel difference between "x" and "+" into the angular deviation between the incoming optical beam and receiving lens 132. Ultimately, the system regulates the angular alignment mount, realigning the incoming optical beam with the center of receiving lens 132, thus concluding the automatic alignment process. Subsequently, camera 300 should capture an image akin to FIG. 8A or 8B.

Symmetrically, we will send light into the receiving fiber, form an optical beam, incident at the transmitting side, form a beam spot either on the transmitting lens surface or on the prismatic reflective film. The system then will compare the spot position to the center of the two LEDs 340 and 341 to determine if misalignment occurs, calculate the extent of the misalignment, and realign the optical beam from the receiving fiber to the center of the transmitting lens. After both realignments finish, the power meter connected to the receiving fiber will receive some optical power from the optical transceiver connected to the transmitting fiber.

Figure 12A:
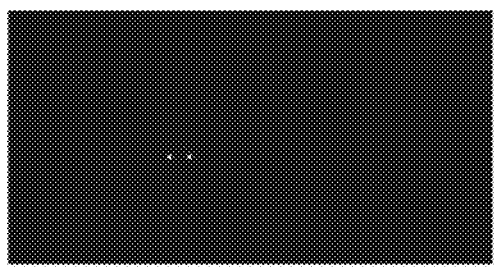
FIG. 12A shows an instance where the initial deviation of the incoming optical beam is extensive enough to preclude incidence on the prismatic reflective film.
Figure 12B:
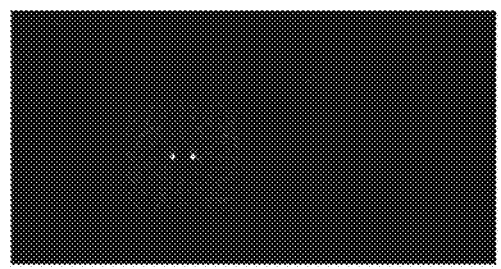
FIG. 12B further shows the initial deviation of the incoming optical beam is extensive enough to preclude incidence on the prismatic reflective film.
Figure 12C:
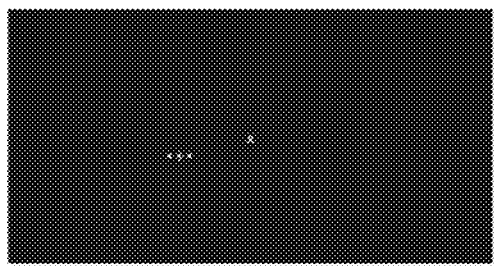
FIG. 12C shows how to approximately estimate the deviation between the incoming optical beam and the receiving lens.
Figure 12D:
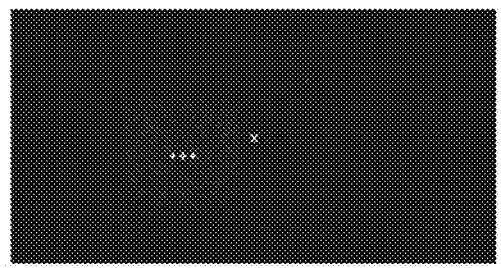
FIG. 12D further approximately estimates the deviation between the incoming optical beam and the receiving lens.

In scenarios where the initial deviation of the incoming optical beam is extensive enough to preclude incidence on the prismatic reflective film 315, as shown in FIGS. 12A and 12B, it remains discernible that the optical beam spot should still align roughly with the picture's center, although it is not visible in this picture. This knowledge enables us to approximately estimate the deviation between the incoming optical beam and the receiving lens 132, depicted as shown in FIGS. 12C and 12D. Consequently, to accommodate greater deviations between the incoming optical beam and the receiving lens 132, we would only need to employ a larger image sensor to get a larger field of view.

Figure 13:
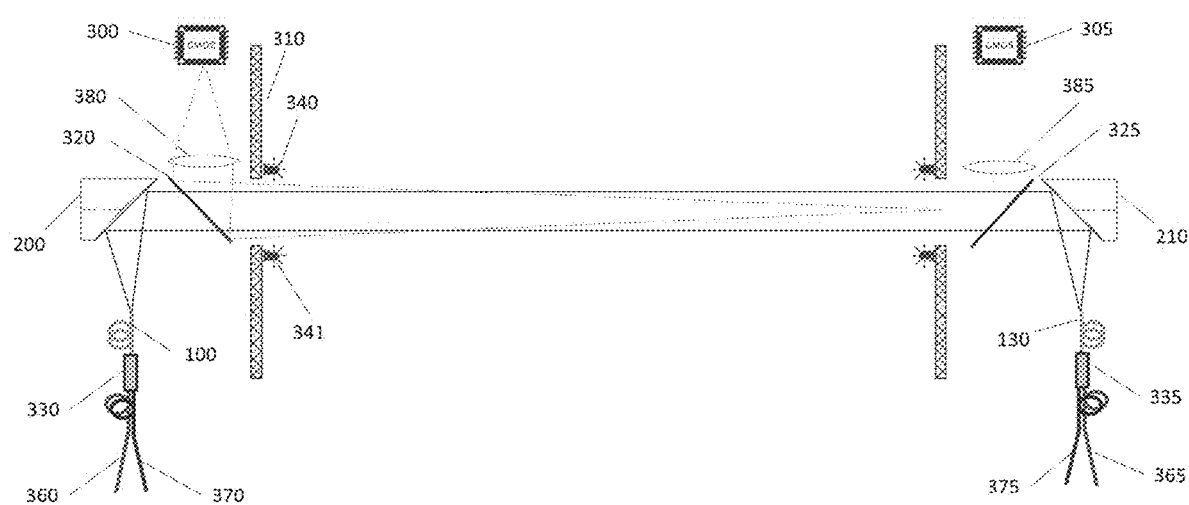
FIG. 13 shows an alignment system using parabolic mirrors.
Figure 14:
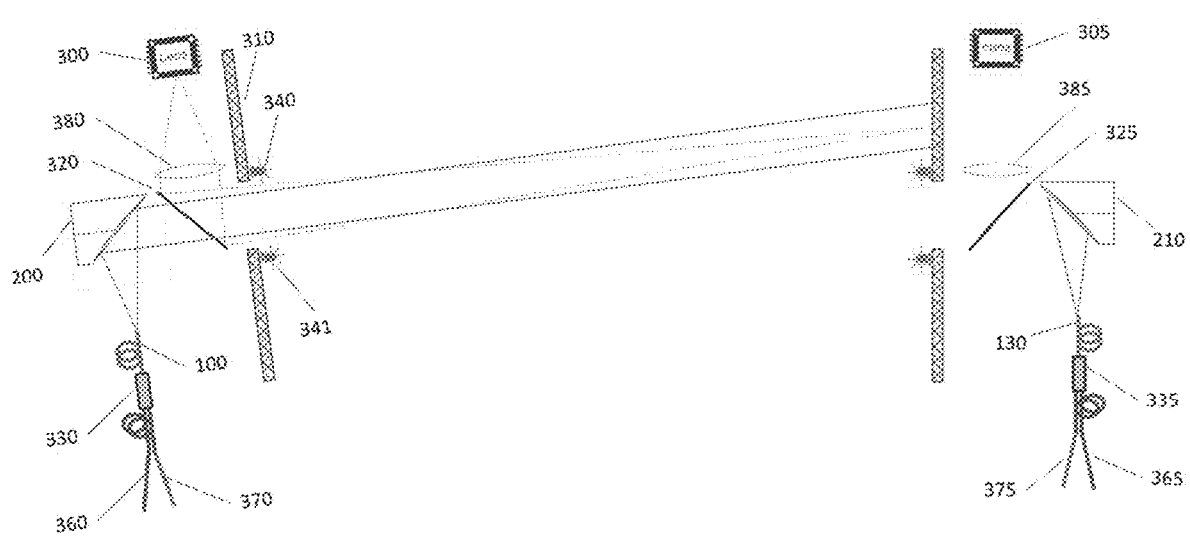
FIG. 14 further shows an alignment system using parabolic mirrors.

This fundamental concept also extends seamlessly to systems employing parabolic mirrors, depicted in FIG. 13 and FIG. 14. In this configuration, optical lenses 112 and 132 are replaced by parabolic mirrors 200 and 210, respectively, while the other elements remain consistent. Moreover, focus lenses 380 and 385 are introduced between the beam splitters and the camera sensors, enabling the formation of focused images on the sensors. The integration of parabolic mirrors mitigates the chromatic aberration commonly associated with optical lenses. Consequently, the system attains an extended spectral range, facilitating the coupling of multiple wavelengths into the transmitting fiber through port 360, using a wavelength division multiplexer. This strategic integration culminates in a system with an almost boundless bandwidth, rendering it remarkably versatile in its applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A low-latency free-space optical data communication channel with automatic alignment function, comprising:
   an optical channel including at least two optical lenses designed to facilitate the transmission of an optical communication signal in the shape of a parallel beam across a free-space channel;
   collimators wherein an input and output thereof are integrated with optical fibers wherein the optical fibers are precisely positioned at a focal point of the two optical lenses and wherein a configuration of the optical lenses ensures accurate imaging of communication signals originating from a transmitting fiber into a corresponding receiving fiber; wherein a strategic placement of at least one LED or other spot light source adjacent to each transmitting and receiving lens,
   high reflective screens, films or tapes with a placement thereof encircling both transmitting and receiving lenses, effectively redirecting the optical signal from an opposite-side collimator back to its origin; and
   cameras, the deployment thereof at each transmitting and receiving terminal, positioned to monitor the optical signal's impact on a lens surface or a high-reflective screen on the opposite side wherein the cameras use at least one lens to get focused image on a camera sensor further wherein the camera records the optical beam spot impacting the opposite side and the corresponding LED(s) aligned with the lens position on the opposite side such that through such observation, the camera accurately computes the disparity between the optical signal and the lens positioned on the opposite side.

2. The low-latency free-space optical data communication channel, as described in claim 1, wherein a wavelength division multiplexer is seamlessly integrated into each of the fibers located at both transmitting and receiving ends.

3. A low-latency free-space optical data communication channel, as detailed in claim 2, wherein the visible light coupled into the fiber and the LEDs are selected to possess an identical or closely adjacent wavelength, affording the opportunity for the deployment of a meticulously positioned narrow bandpass filter.

4. The low-latency free-space optical data communication channel, as described in claim 1, further encompassing the capability for bi-directional communication.

5. The low-latency free-space optical data communication channel, as detailed in claim 1, integrating a pivotal beam splitter or filter positioned between the fiber and camera at both the transmitting and receiving termini.

6. The low-latency free-space optical data communication channel, as described in claim 1, whereby the camera effectively harnesses the lens within the communication channel to capture a focused image at both the transmitting and receiving terminals.

7. The low-latency free-space optical data communication channel, as described in claim 1, wherein the camera diverges from utilizing the lenses present in the communication channel.

8. A low-latency free-space optical data communication channel with automatic alignment function, comprising:
   an optical channel including of at least two opposing parabolic mirrors designed to facilitate transmission of an optical communication signal in a shape of a parallel beam across a free-space channel;
   collimators, an input, and output thereof integrated with optical fibers wherein the optical fibers are precisely positioned at focal points of the two opposing parabolic mirrors and configuration of the parabolic mirrors ensures accurate imaging of communication signals originating from a transmitting fiber into a corresponding receiving fiber, effectively establishing one or more optical communication channels;
   at least one LED or other spot light adjacent to each transmitting and receiving parabolic mirror;
   high-reflective screens, films, or tapes encircling both transmitting and receiving parabolic mirror; and
   a camera at each transmitting and receiving terminal, positioned to monitor the optical beam's impact on the parabolic mirror surface or a high-reflective screen on the opposite side.

9. The low-latency free-space optical data communication channel, as described in claim 8, wherein a wavelength division multiplexer is seamlessly integrated into each of the fibers located at both transmitting and receiving ends.

10. The low-latency free-space optical data communication channel, as detailed in claim 9, wherein the visible light coupled into the fiber and the LEDs are selected to possess an identical or closely adjacent wavelength.

11. The low-latency free-space optical data communication channel, as described in claim 8, further including the capability for bi-directional communication.

12. The low-latency free-space optical data communication channel, as detailed in claim 8, integrating a pivotal beam splitter or filter positioned between the fiber and camera at both the transmitting and receiving termini.

* * * * *